2,976,114
PROCESS FOR SEPARATING NIOBIUM AND TANTALUM FROM EACH OTHER

Fritz Kern, Binningen, and Waldemar Schornstein, Arlesheim, Switzerland, assignors to Ciba Limited, Basel, Switzerland, a Swiss firm No Drawing. Filed Jan. 25, 1957, Ser. No. 636,235
Claims priority, application Switzerland Feb. 6, 1956
5 Claims. (Cl. 23—17)

It is known that the two chemically related metals tantalum and niobium (also known as columbium in some countries), which generally occur in nature associated with one another, are very difficult to separate from each other.

So far as is known the industrial process for separation is still generally the process based on the principle of Marignac (1865). The Marignac process is based on the fractional crystallisation of the alkali metal double fluorides, which enables the sparingly soluble $K_2TaF_7$ to be separated from a solution containing $K_2NbOF_5$. The main disadvantage of this process is that it necessitates working with hydrofluoric acid.

The selective chlorination of materials containing niobium and tantalum in oxidised form which is described in French Patent No. 973,896 is carried out in the absence of reducing gases, but at very high temperatures of about 1200° C. The process of separation described in United States Patent No. 2,427,360 which depends on the formation of nitride followed by halogenation and the process described in United States Patent No. 2,443,254 in which the niobium constituent is first selectively reduced at 600–1200° C. and then chlorinated, are both processes working at high temperatures.

The process of separation described in United States Patent No. 2,537,316 involves the reduction of the accompanying elements in more or less colloidal solutions or suspensions obtained by digesting the ore with, for example, sulfuric acid and subsequent selective hydrolysis, whereby the reduced accompanying elements remain in solution. The process therefore entails the use of very unstable solutions, and the digestion with sulfuric acid is a lengthy process.

Finally, the working conditions in the potassium oxalate hydrolysis described in United States Patent No. 2,481,584 are difficult to maintain.

The present invention provides an advantageous process for the separation of niobium and tantalum from each other, wherein a material which contains niobium and tantalum in oxidised form, for example, a slag or especially a concentrate or ore, which may have been treated to enrich its content of niobium and tantalum, or a mixture of oxides of niobium and tantalum, is converted by means of chlorine gas and a reducing agent into a mixture of chlorination products in such manner that the said mixture contains the niobium preponderantly or exclusively in the form of its oxychloride and the tantalum in the form of its pentachloride, and the said mixture is either subjected to fractional condensation or split up into fractions by sublimation.

As starting materials for the present process there may be used the ordinary industrially available mixtures containing oxides of niobium and tantalum or natural products which contain these two elements mostly in the form of their oxides.

The chlorination mixtures which are to be subjected to the present process of separation and contain the tantalum for the greater part in the form of its pentachloride ($TaCl_5$) and the niobium for the greater part in the form of its oxychloride, can be obtained by methods in themselves known, for example, by the chlorination of a mixture of the oxides of niobium and tantalum with chlorine gas and a reducing agent, such as carbon, at a temperature within the range of 400° C. to 1000° C. in a shaft furnace or tube furnace. In order to obtain the niobium preponderantly or exclusively in the form of its oxychloride and the tantalum preponderantly or exclusively in the form of its pentachloride, it is necessary to avoid after-reaction of the chlorination products. The vapours of the condensation products are therefore allowed to remain for as short a time as possible, that is to say, at most for a few seconds, at a high temperature in contact with one another and with the waste gases of the chlorination which contain carbon monoxide and chlorine. This can be achieved, for example, by diluting the vapours with a cold foreign gas, for example, cooled reaction gas which is free from chloride and is recycled, or by ensuring that the conduit between the chlorinator and the condenser has a length or cross-sectional area as short or small, respectively, as possible. For the same purpose there may be added to the warm chlorination gases a liquid chloride, for example, silicon tetrachloride, titanium tetrachloride or carbon tetrachloride, advantageously in finely divided form and in such a quantity that all the liquid chlorides remain in the vapour phase and the added liquid chlorides evaporate.

Owing to the property which niobium has of forming oxychlorides there is obtained in the above manner a chlorination mixture which contains the niobium preponderantly or exclusively in the form of oxychloride and the tantalum in the form of pentachloride.

Any chlorides of other elements than niobium and tantalum which may be present in the chlorination mixture, due to the presence of such elements as impurities in the starting material, for example, the chlorides of silicon, titanium, tin, manganese, etc., can be removed in a simple manner, for example, by so adjusting the temperature of the chlorination mixture and in the chamber in which the chlorides of niobium and tantalum are condensed by methods in themselves known that those chlorides of the accompanying elements whose boiling or vaporisation points are sufficiently far removed from those of the niobium and tantalum chlorides are separated from the latter chlorides to a far reaching extent. Thus, for example, the sparingly volatile chloride of manganese and the sparingly volatile chlorides of alkaline earth metals are first separated, and the more easily volatile chlorides, for example, those of silicon, tin and titanium, are separated only after condensation of the chlorination mixture containing niobium and tantalum, and are so separated, for example, by precipitating them in the condensation chambers of lower temperature together with the chlorides, which are liquid at ordinary temperature and may be added to the chlorination gases for the purpose of rapid cooling.

The sublimation of the resulting mixture, in which the tantalum is present predominantly or exclusively in the form of its pentachloride and the niobium in the form of its oxychloride, can be carried out by methods in themselves known, for example, under ordinary pressure with the exclusion of moisture. Preferably, however, this is carried out under a considerably reduced pressure so that the sublimation temperature can be kept relatively low.

The sublimation may also be carried out, for example, by slowly heating up the chlorination mixture in the absence of moisture under a reduced pressure of the order of about 0.1 mm. of mercury, condensing the pentachlorides, especially tantalum pentachloride, which vaporise first, and separating them, and subliming the niobium oxychloride, which has a substantially lower vapour pressure than tantalum pentachloride, at higher temperatures and, if desired, separating it in one or more fractions in known manner.

After the sublimation, any residue remaining in the sublimation apparatus and the fraction containing tantalum pentachloride, if it contains substantial amounts of niobium pentachloride, which may have been present in the starting mixture and sublimes with tantalum pentachloride, may be rechlorinated, that is to say, returned as additions to the chlorination mixture to be subjected to the separation process.

It will be understood that the fractions obtained by the process may be repeatedly sublimed for the purpose of further purification or enrichment. However, the first sublimation carried out in accordance with the process of the invention usually results in a relatively good separation of the two elements niobium and tantalum.

By the present process it is therefore possible to split up mixtures containing niobium and tantalum, which are normally difficult to split up, in a single operation by fractional condensation or other simple operation (sublimation) into fractions, of which one consists principally of tantalum and the other of niobium.

The following examples illustrate the invention, the parts and percentages being by weight:

EXAMPLE 1

Briquettes consisting of 20 percent of carbon black and 80 percent of a mixture of niobium and tantalum pentoxides, in which the niobium and tantalum are present in the ratio 1:1, were chlorinated in a current of chlorine at 1000 or 600° C. in a shaft furnace, and the volatile chlorination products were separated and removed from the residual gases by being rapidly cooled in an air-cooled condensation chamber.

The chlorination products so obtained were then subjected to fractional vacuum sublimation under a pressure of about 0.1 mm. of mercury. The results are given in the following table:

Table I

| Chlorination temperature | Fraction | Sublimation temperature of the chlorination product, ° C. | Percent of chlorination product (calc. as oxide) | Analyses | |
|---|---|---|---|---|---|
| | | | | $Nb_2O_5$, Percent | $Ta_2O_5$, Percent |
| 600° C. | 1 | up to 110 | 27 | 37 | 63 |
| | 2 | 130–200 | 10 | 40 | 60 |
| | 3 | 200–230 | 42 | 79 | 21 |
| | 4 | 240–255 | | | |
| | Residue | | 22 | 21 | 79 |
| 1,000° C. | 1 | up to 130 | 41 | 42 | 58 |
| | 2 | 130–200 | 41 | 81 | 19 |
| | Residue | | 18 | 15 | 85 |

EXAMPLE 2

A mixture of about 5 parts of niobium oxychloride ($NbOCl_3$) and about 5 parts of tantalum pentachloride ($TaCl_5$) were subjected to vacuum sublimation under a pressure of about 0.1 mm. of mercury, and the fractions were collected at different temperatures.

In Table II below there are given particulars of the fractions, temperature ranges, weights of the fractions expressed as percentages on the starting mixture (calculated as oxides) and also the compositions of the fractions obtained, expressed as percentages of $Nb_2O_5$ and percentages of $Ta_2O_5$.

Table II

| Fraction | Sublimation temperature, ° C. | Weight as percentage of the starting mixture | Analyses | |
|---|---|---|---|---|
| | | | $Nb_2O_5$, Percent | $Ta_2O_5$, Percent |
| 1 | 100–110 | 42.5 | 0.5 | 99.5 |
| 2 | 110–130 | 3.5 | 50 | 50 |
| 3 | 130–210 | 32.5 | 98.8 | 1.2 |
| 4 | 210–255 | 6.6 | 99.5 | 0.5 |
| Residue | | 15.1 | 26 | 74 |

The non-volatile residue arose either from partial hydrolysis which occurred during removal of the fractions or as the result of double decomposition between $NbOCl_3$ and $TaCl_5$ during the sublimation.

EXAMPLE 3

A columbite ore containing 26 percent of $Ta_2O_5$ and 47 percent of $Nb_2O_5$ was formed into briquettes with 20 percent of its weight of carbon calculated on the weight of the ore, and the briquettes were chlorinated at 700° C. in a shaft furnace. The resulting chlorination products were passed through a system consisting of two condensation vessels, of which one was maintained at 200° C. and the other at room temperature. The products which separated in the first condensation vessel were converted into oxide and spectrographically analysed. The ratio of $Nb_2O_5$ to $Ta_2O_5$ was in two experiments 86:14 and 84:16.

Analysis of the product in the second condensation vessel showed a higher content of niobium than would be expected from considerations of vapour pressure, because no precautions were taken to prevent condensed $NbOCl_3$ being carried over in the form of dust.

The separation of the niobium oxychloride fraction and its separation from the tantalum pentachloride fraction therefore take place in this example directly after the chlorination of the ore. In this manner, in addition to the separation effect the danger of the after-reaction of the niobium oxychloride, which is especially liable to occur in the vapour phase, is eliminated in the shortest possible manner.

What is claimed is:

1. In a process for separating tantalum and niobium values from each other, the steps of heating a mixture of oxides of these metals to a temperature between 400° C. and 1000° C. in the presence of carbon, passing a current of chlorine gas over the oxides, whereby a mixture of volatile chlorination products containing niobium values preponderantly in the form of niobium oxychloride and tantalum values preponderantly in the form of tantalum pentachloride is produced, cooling below their solidification temperature the thus obtained volatile chlorination products within a few seconds after chlorination, subsequently heating the solid mixture thus obtained and separately subliming the tantalum and niobium values.

2. The process of claim 1, wherein the sublimation is carried out under a pressure of at most 0.1 mm. of mercury.

3. In a process for separating tantalum and niobium values from each other, the steps of heating a mixture of oxides of these metals to a temperature between 400° C. and 1000° C. in the presence of carbon, passing a current of chlorine gas over the oxides, whereby a mixture of volatile chlorination products containing niobium values preponderantly in the form of niobium oxychloride and tantalum values preponderantly in the form of tantalum pentachloride is produced, cooling the thus obtained volatile chlorination products within a few seconds after chlorination first to a temperature below the condensation temperature of the niobium values contained but above the condensation temperature of the tantalum values, recovering the niobium values, thereafter further cooling the residual chlorination products and recovering the tantalum values.

4. Process as claimed in claim 3, wherein chlorination is effected at a temperature between 600° C. and 1000° C.

5. Process as claimed in claim 4, wherein the cooled chlorination products are further cooled to a temperature between 150° C. and 200° C., to condense the niobium values, and subsequently to a temperature between 25° C. and 50° C. to condense the tantalum values.

(References on following page)

References Cited in the file of this patent

UNITED STATES PATENTS

| | | |
|---|---|---|
| 2,427,360 | Kroll et al. | Sept. 16, 1947 |
| 2,429,671 | Cuvelliez | Oct. 28, 1947 |
| 2,443,254 | Kroll et al. | June 15, 1948 |
| 2,675,891 | Frey | Apr. 20, 1954 |

FOREIGN PATENTS

| | | |
|---|---|---|
| 973,896 | France | Feb. 15, 1951 |
| 893,197 | Germany | Oct. 15, 1953 |
| 108,051 | Australia | Aug. 3, 1939 |

OTHER REFERENCES

May et al.: "Industrial and Engineering Chemistry," vol. 46, No. 12, December 1954, pages 2495 to 2500.

Hampel: "Rare Metals Handbook," publ. by Reinhold Publ. Co., N.Y., 1954, page 396.